Figure 6:
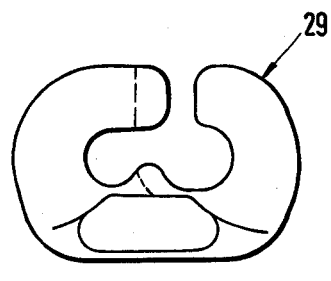

United States Patent [19]

Rieger et al.

[11] 4,063,583
[45] Dec. 20, 1977

[54] TIRE CHAIN

[76] Inventors: Dr. Hansjorg Rieger, Saarstrasse 48, 7080 Aalen; Leo Kess, Schillerstrasse 20, 7080 Aalen-Unterkochen; Dietmar Holzwarth, Vogelhofstr. 51, 7070 Schwab. Gmund, all of Germany

[21] Appl. No.: 702,920

[22] Filed: July 6, 1976

[30] Foreign Application Priority Data

July 25, 1975 Germany .............................. 2533838

[51] Int. Cl.² .............................................. B60C 27/06
[52] U.S. Cl. ..................... 152/241; 152/233; 152/243; 59/85; 59/93
[58] Field of Search .................. 152/239, 241-244, 152/233; 59/84, 85, 90, 93

[56] References Cited

U.S. PATENT DOCUMENTS

| | | | |
|---|---|---|---|
| 3,595,292 | 7/1971 | Muller | 152/243 |
| 3,614,971 | 10/1971 | Muller | 152/243 |
| 3,785,422 | 1/1974 | Witzel | 152/241 |
| 3,835,908 | 9/1974 | Rieger et al. | 152/243 |
| 3,892,268 | 7/1975 | Asbeck | 152/243 |

*Primary Examiner*—Drayton E. Hoffman
*Attorney, Agent, or Firm*—Mark P. Stone; Haynes N. Johnson

[57] ABSTRACT

A tire chain with separable chain strands the end links of which are connectable at each separation point by use of two connecting elements which can be hooked into each other and which are each safely connected with an end link, wherein each connecting element has a body comprising at least one portion bounding an insertion slot which portion has a cross-section decreased at its free end at the expense of its width and wherein the width of the insertion slot is smaller than the height of each of those portions of the body which bound the insertion slot.

14 Claims, 9 Drawing Figures

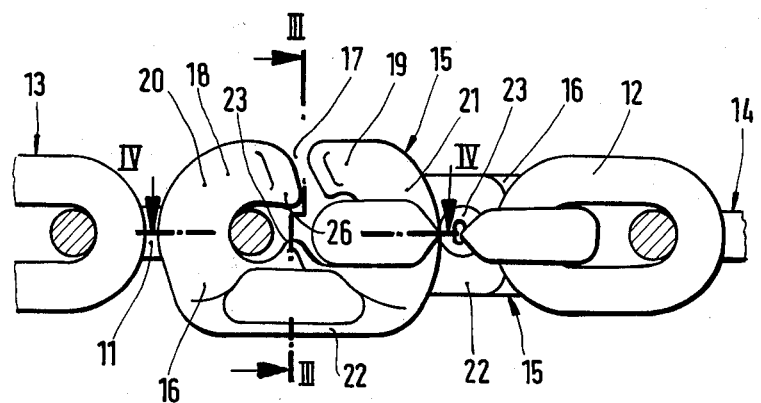
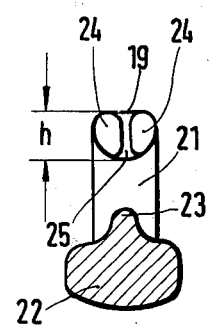
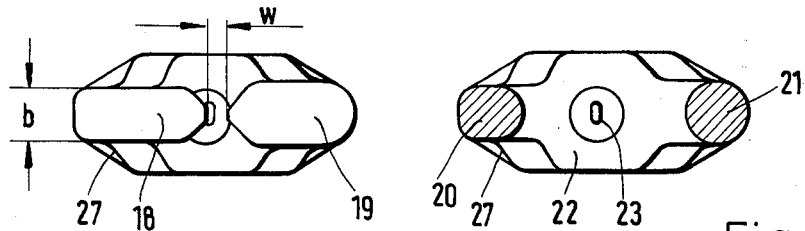
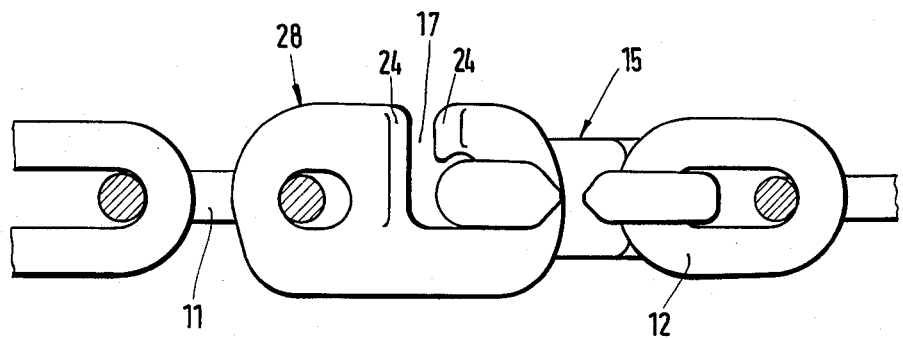
Fig.1　Fig.3　Fig.2　Fig.4　Fig.5

TIRE CHAIN

The invention relates to a tire chain, especially anti-skid chain, with at least one separable chain strand, the links of which, adjoining each other at the separation point, are connectable by use of a connecting element having a body with an insertion slot.

Tire chains of the above mentioned kind are known, in which the end links of two chain strand sections to be connected with each other are connectable by a single C-shaped connecting element, the insertion slot of which is closed by additional locking elements after the end links have been mounted. The known tire chains of this type are unsatisfactory, as their handling is difficult and practically impossible without tools. Another disadvantage is that the locking elements can get lost and that not only the assembly of the locking elements but also their disassembly is complicated after the chain has been used for a longer period.

It is the object of the present invention to provide a tire chain of the type mentioned in which at the separation points the strands can easily and quickly be opened and closed without the aid of tools and without the use of locking elements.

In accordance with the present invention this object is achieved therein that each separation point is provided with two connecting elements which can be hooked into each other, each being safely connected with an end link of the chain strand section to be connected, that at least one of the portions of the body bounding the respective insertion slot has a cross-section decreased at its free end at the expense of the width of said end and that the width of the insertion slot is smaller than the height of each of those portions of the body which bound the insertion slot.

The advantage of the tire chain according to the invention consists therein that the connecting elements can easily be connected with each other by joining them in the region of their insertion slots and then at first rotating one of the connecting elements around 90° in a first direction and subsequently around a further 90° in a second direction.

As soon as the end links are brought into an essentially aligning position in this way the connection between the chain strand sections has been established and because of the shape of the insertion slots and of the confining parts it is guaranteed that the end links do not come loose unintentionally.

It has been found to be especially advantageous if both connecting elements have a C-shaped body, the ends of which, confining the insertion slot, are bounded by roof-shaped wedge surfaces, the tops of which lie in the centre plane extending through the ends bounding the insertion slots, the shoulders adjoining said ends and a bridge portion of the body extending parallel to the ends.

Preferably the wedge planes bounding the insertion slot are X-shaped and two wedge surfaces, each arranged at an end bounding the insertion slot of the body encircle an angle of about 90°. Such an arrangement offers the advantage that the insertion slot can be kept exceptionally small.

Figure 7:
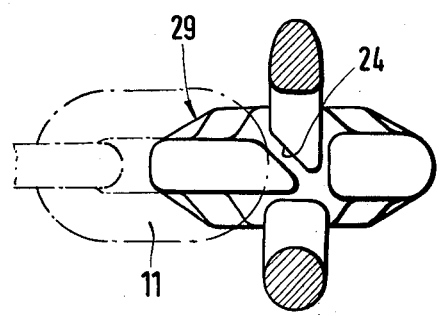
Figure 8:
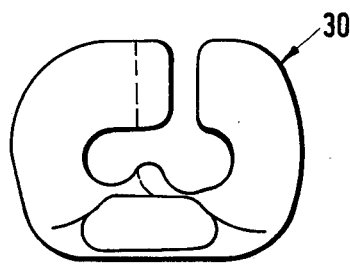

The Figures show:

FIG. 1 the side view of a chain strand showing a separation point;

FIG. 2 the plan view of a connecting element used at the separation point;

FIG. 3 a sectional view along the line III-III in FIG. 1 through one of the connecting elements;

FIG. 4 a sectional view along the line IV-IV in FIG. 1 through one of the connecting elements;

FIG. 5 the side view of modified embodiment;

FIG. 6 a connecting element of a further embodiment;

FIG. 7 the position of two connecting elements according to FIG. 6 at the separation point of two chain strand sections during joining;

FIG. 8 a further connecting element and

Figure 9:
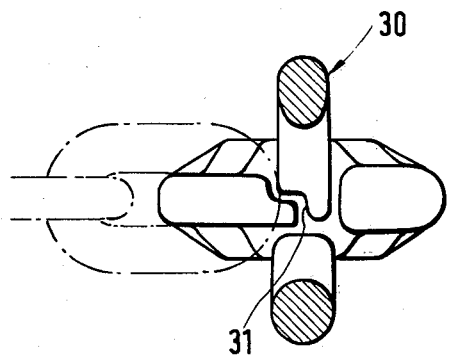

FIG. 9 the position of two connecting elements according to FIG. 8 at the separation point of two chain strand sections during joining.

11 and 12 in FIG. 1 are the end links of two chain strand sections, which are connected with each other by two connecting elements 15 of the same form. The connecting elements 15 have a body 16 with two portions 18,19 bounding an insertion slot 17. The portions 18 and 19 turn each into a bridge portion 22 via bows 20 and 21. At the side opposite the insertion slot 17 the bridge portion 22 is provided with projection 23.

The ends of the portions 18 and 19 of the connecting element 15 are provided with wedge planes 24, the tops 25 of which lie in the centre plane extending through the insertion slot 17, the end portions 18,19, the ajoining bows 20,21 and the bridge portion 22 of the body 16. The wedge planes are arranged essentially in X-shape and encircle at each end of the portions 18 and 19 an angle of about 90°.

As a comparison of FIGS. 2 and 3 shows, at their ends the portions 18 and 19 are weakened at the expense of the width $b$ of the respective end, and the width $w$ of the insertion slot 17 is smaller than the height $h$ of the portions 18 and 19 bounding the insertion slot.

Portion 18 of the body comprises a projection 26 directed to the bridge portion 22 of the body 16. The end link 11 is safely held in the connecting element 15 by the projections 23 and 26.

FIG. 4 shows, that the cross-section of the bow 20 of the body 16, in which the end link 11 is suspended, is oval shaped, while the bow 21 has a circular cross-section. The cross-section of the bow 21 is larger than the cross-section of the end links 11 and 12. The choice of an oval cross-section for the bow 20 and the increase of the cross-section 21 compared to the cross-section of the end links 11 and 12 guarantees a great stability of the connecting elements.

The bridge portion 22 of the body 16 is provided with stop areas 27 to avoid clamping of the end links 11 and 12 and of the connecting elements 15. For reasons of stability the use of a smaller inner pitch of the body is advisable. This should be approximately 3 - 3½ times the material thickness of the end links 11 and 12. In case of such a small pitch it proves advantageous to arrange the insertion slot 17 diagonally, as can be seen from FIG. 1.

FIG. 5 shows a modified embodiment with a connecting element 28, which is combined with a connecting element 15. The connecting element 28 also has wedge surfaces 24 in the region of the insertion slot 17. The main difference between the two connecting elements 15 and 28 consists therein that the connecting element 28 completely surrounds the bow of the end link 11. In other words it must be connected to the connecting element 28 by welding, while in case of the connecting element 15 the fastening of the end links can take place by first spreading the portions 18 and 19 a little and subsequently pressing them back into the form as shown in FIG. 1.

While the connecting elements 15 are provided with four wedge surfaces 24 each the connecting element 29 according to FIGS. 6 and 8 has only one wedge surface, but otherwise it corresponds to the connecting element 15 in its arrangement and its assembly and disassembly.

Instead of wedge surfaces 24 a step-like developed end 31 is used in the connecting element 30 according to FIG. 8. As FIG. 9 shows such a connecting element can also easily be assembled and disassembled.

What is claimed is:

1. Tire chain, especially anti-skid chain, with at least one separable chain strand, the end links of which, adjoining each other at the separation point, are connectable by use of a connecting element having a body with an insertion slot, characterized therein that each separation point is provided with two connecting elements (15,28, 29,30) which can be hooked into each other, each safely connected with an end link (11,12), that at least one of the portions (18,19) of the body (16) bounding the respective insertion slot (17) has a cross-section decreased at its free end at the expense of the width (b) of said portion and that the width (w) of the insertion slot is smaller than the height (h) of each of those portions of the body which bound the insertion slot.

2. Tire chain according to claim 1, characterized therein that the connecting elements (15,28,29) show wedge surfaces (24) in the region of the insertion slot (17).

3. Tire chain according to claim 1, characterized therein that both connecting elements (15) have a C-shaped body (16), the portions (18,19) of which, bounding the insertion slot (17), are provided by roof-shaped wedge surfaces (24) the tops (25) of which lie in the center plane extending through the portions (18,19) bounding the insertion slot (17) through bows (20,21) ajoining said portions, and through a bridge portion (22) of the body (16) extending parallel to said portions (18,19).

4. Tire chain according to claim 2, characterized therein that the wedge surfaces (24) bounding the insertion slot (17) are arranged in an essentially x-shaped manner and that the two wedge surfaces (24) arranged at each end of the body portions (18,19) encircle an angle of about 90°.

5. Tire chain according to claim 1, characterized therein that the insertion slot (17) is arranged diagonally.

6. Tire chain according to claim 3, characterized therein that a portion of the body (16) bounding the insertion slot (17) has a projection (26) directed to the bridge portion (22) of the body.

7. Tire chain according to claim 6, characterized therein that the bridge portion (22) of the body (16) is provided with a projection (23) directed to the insertion slot (17).

8. Tire chain according to claim 1, characterized therein that the body (16) has a widened bridge portion (22).

9. Tire chain according to claim 8, characterized therein that the bridge portion (22) of the body (16) is provided with stops (27) preventing clamping of the end links (11,12) and the connecting element (15).

10. Tire chain according to claim 3, characterized therein that the bow (20) of the body (16) embraced by the respective end link (11,12) has an oval cross-section.

11. Tire chain according to claim 3, characterized therein that the respective interconnected bows (21) of the connecting elements (15) have a circular cross-section which is larger than the cross-section of the end links (11,12).

12. Tire chain according to claim 3 characterized therein that the insertion slot is arranged diagonally.

13. Tire chain according to claim 4 characterized therein that the insertion slot is arranged diagonally.

14. Tire chain according to claim 3 characterized therein that a portion of the body bounding the insertion slot has a projection directed towards the bridge portion of the body.

* * * * *